United States Patent
Park et al.

(10) Patent No.: US 7,583,592 B2
(45) Date of Patent: Sep. 1, 2009

(54) METHOD FOR ROUTE RECOVERY IN WIRELESS NETWORK OF TREE TOPOLOGY

(75) Inventors: Jong-hun Park, Suwon-si (KR); Yong Liu, New York, NY (US); Myung-jong Lee, New York, NY (US); Xu-hui Hu, New York, NY (US); Tae-kyung Kwon, New York, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 10/910,649

(22) Filed: Aug. 4, 2004

(65) Prior Publication Data

US 2005/0047390 A1 Mar. 3, 2005

Related U.S. Application Data

(60) Provisional application No. 60/499,707, filed on Sep. 4, 2003, provisional application No. 60/499,366, filed on Sep. 3, 2003.

(30) Foreign Application Priority Data

Mar. 23, 2004 (KR) ............... 10-2004-0019552

(51) Int. Cl.
*H04L 12/26* (2006.01)
(52) U.S. Cl. .................. 370/218; 370/217; 370/242
(58) Field of Classification Search ............. 370/217, 370/218, 242
See application file for complete search history.

(56) References Cited

U.S. PATENT DOCUMENTS

| 5,999,286 | A | * | 12/1999 | Venkatesan | 398/5 |
| 2002/0062388 | A1 | * | 5/2002 | Ogier et al. | 709/238 |
| 2007/0038767 | A1 | * | 2/2007 | Miles et al. | 709/230 |

FOREIGN PATENT DOCUMENTS

| JP | 05327710 | 12/1993 |
| JP | 07-235923 | 9/1995 |
| JP | 2003-069579 A | 3/2003 |

OTHER PUBLICATIONS

"Wireless Ad Hoc Communication System", NTT R&D, pp. 231-238, Feb. 10, 1999.

* cited by examiner

*Primary Examiner*—Huy D. Vu
*Assistant Examiner*—Jason E Mattis
(74) *Attorney, Agent, or Firm*—Sughrue Mion, PLLC

(57) ABSTRACT

A route recovery method in a wireless network of a tree topology, in which a second node, which is a lower node of a first node and is disconnected from the first node, recovers the route in the network. The route recovery method includes the second node broadcasting a local repair request (LREQ) packet, each node receiving the LREQ packet sending a local repair reply (LREP) packet to the second node to act as a relay node for the route recovery, the second node selecting the relay node from among the nodes sending the LREP packet, and sending a local repair confirm (LCON) packet from the second node to the relay node, and establishing the route between the second node and the first node by the relay node sending a local repair inform (LINF) packet to the first node.

13 Claims, 4 Drawing Sheets

METHOD FOR ROUTE RECOVERY IN WIRELESS NETWORK OF TREE TOPOLOGY

CROSS-REFERENCE TO RELATED APPLICATIONS

This application claims the benefits of U.S. Provisional Application No. 60/499,707 filed on Sep. 4, 2003 and U.S. Provisional Application No. 60/499,366 filed on Sep. 3, 2003 in the United States Patent and Trademark Office, and Korean Patent Application No. 10-2004-0019552 filed on Mar. 23, 2004 in the Korean Intellectual Property Office, the disclosures of which are incorporated herein by reference in their entirety.

BACKGROUND OF THE INVENTION

1. Field of the Invention

The present invention is generally related to a wireless network of a tree topology. More particularly, the present invention is directed to a method for optimally recovering a broken route, while maintaining an existing tree route, in case of a failure of a node or a link configuring a wireless tree network.

2. Description of the Related Art

Recent developments of Internet and mobile communication technologies provide diverse multimedia services, which may be presented almost instantaneously even over vast distances, so as to remarkably change its users' lives. Particularly, with the prevalence of compact portable electronic devices such as notebook computers and personal digital assistants (PDA), more efforts are made to implement data communications through not only wired networks but also wireless networks.

A representative wireless network is an ad-hoc network. The ad-hoc network has no central and integral management device, does not utilize an existing communication infrastructure, and has no control device, such as a router, a host, or a mobile base station, for providing links between mobile nodes. Instead, the mobile nodes act as routers. Accordingly, when a certain mobile node intends to communicate with a correspondent node, the mobile node needs to establish a communication path to the correspondent node via other nodes located between the mobile node and the correspondent node.

An example of an ad-hoc network is a wireless network having a tree structure. The tree structure is widely used in ad-hoc networks because the tree structure has good addressing and routing features. The tree-structured network sequentially assigns addresses according to a tree hierarchy and packets are delivered along a tree route.

However, if a node configuring the network of the tree structure fails due to a battery discharge or failure, movement out of the network, or a link is disconnected, any descendent nodes of a broken node or link have to re-establish and recover a communication route in thee tree structure.

A conventional algorithm re-establishes a route in a manner that each descendent node of a broken node or link attempts to re-connect to the network. The conventional algorithm results in a control overload problem, address changes of the existing tree structure, and changes of the topology of the existing tree structure.

Additionally, the descendent nodes of the broken link have to update an information table which contains information such as a local address, a depth in the tree structure, and a list of neighbor nodes. If the broken link is related to a node of an upper layer, a lower tree structure is adversely affected and a new link needs to be configured.

SUMMARY OF THE INVENTION

To address the above problems of the conventional arrangement, an exemplary aspect of the present invention is to provide a method for optimally recovering a route, while maintaining an existing tree structure, when a node or a link configuring a wireless tree network fails. While illustrative embodiments of the present invention may solve these problems as well as other problems, embodiments of the present invention are not required to solve the problems described herein or any other problems.

To accomplish the above aspect and feature of the present invention, in a wireless network of a tree topology having a plurality of nodes, a second node, which is a node lower than a first node and disconnected from the first node, recovers the route in the network. In particular, a route recovery method includes the second node broadcasting a local repair request (LREQ) packet, at least one node receiving the LREQ packet and sending a local repair reply (LREP) packet to the second node to act as a relay node for the route recovery, the second node selecting the relay node from among the at least one node sending the LREP packet, the second node sending a local repair confirm (LCON) packet to the selected relay node, and the relay node establishing the route between the second node and the first node by the relay node sending a local repair inform (LINF) packet to the first node.

Advantageously, the route is established between an upper node, which is located above the first node, and the second node by the relay node sending the LINF packet to the upper node when the first node is disconnected from the network.

Advantageously, the route recovery method further includes a lower node, which is located below the second node, re-broadcasting the LREQ packet when the second node does not receive the LREP packet for a predetermined amount of time.

The LREP packet is sent to the second node along with an address of the lower node when the lower node receives the LREP packet.

The relay node establishes a route from one of the first node or the upper node to the second node via the lower node.

The LREQ packet includes at least one of an address of the second node and a broadcast ID of the LREQ packet.

The second node broadcasts the LREQ packet by setting a limit value on the hop count from the second node to the relay node.

When the LREP packet is not received for a certain amount of time, the second node re-broadcasts the LREQ packet by increasing the limit value on the hop count from the second node to the relay node.

The second node selects the relay node from among the at least one node sending the LREP packet, based on the hop count to the second node.

The second node selects the relay node from among the at least one node sending the LREP packet, based on a hierarchy in the tree topology.

The LINF packet contains an address of the node sending the LINF packet and the address of the second node.

The relay node stores a routing table recording the route from the first node to the second node.

Each node along the route from the first node to the second node stores a routing table recording the route.

The first node sends to the second node an LCON packet-including an address of each node along the route from the first node to the second node.

BRIEF DESCRIPTION OF THE DRAWING FIGURES

These and/or other exemplary aspects and advantages of the invention will become apparent and more readily appreciated from the following description of illustrative embodiments, taken in conjunction with the accompanying drawing figures of which:

DETAILED DESCRIPTION OF EXEMPLARY EMBODIMENTS

Figure 1:
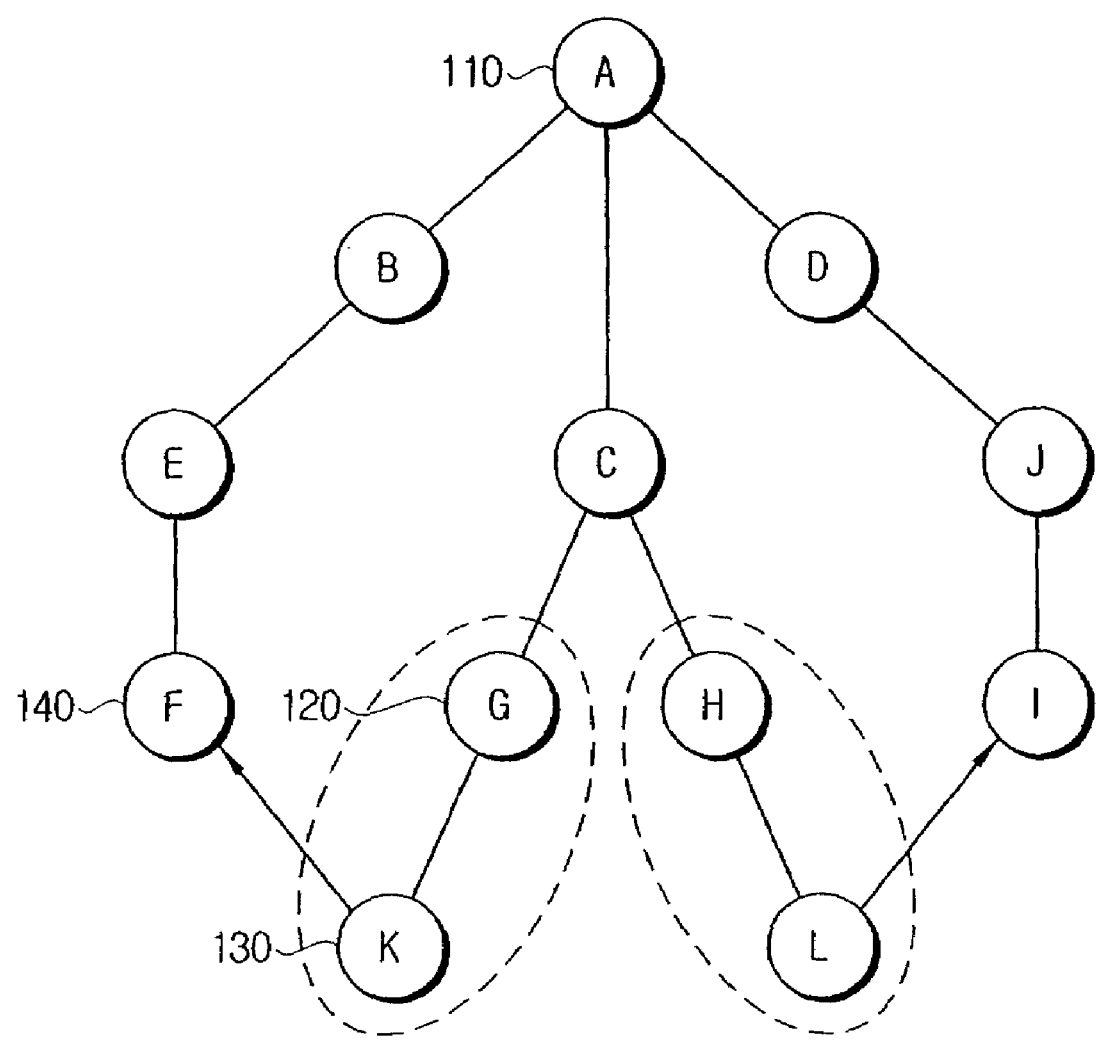
FIG. 1 is a diagram illustrating an exemplary wireless network of a tree topology.

Reference will now be made in detail to illustrative, non-limiting embodiments of the present invention, examples of which are illustrated in the accompanying drawing figures, wherein like reference numerals refer to the like elements throughout. The illustrative embodiments are described below in order to explain the present invention by referring to the drawing figures.

FIG. 1 illustrates an exemplary wireless network of a tree topology. Referring to FIG. 1, the wireless network includes at least two nodes. Nodes from an uppermost node A to a lowest node L in a tree structure are shown in FIG. 1. It is assumed that the node C is disconnected from a link due to causes such as a battery discharge, a software or hardware failure, or a movement out of a network. The nodes G, K, H, and L, which are lower nodes of the node C, are disconnected from the network since the tree route via the node C is broken.

Figure 2:
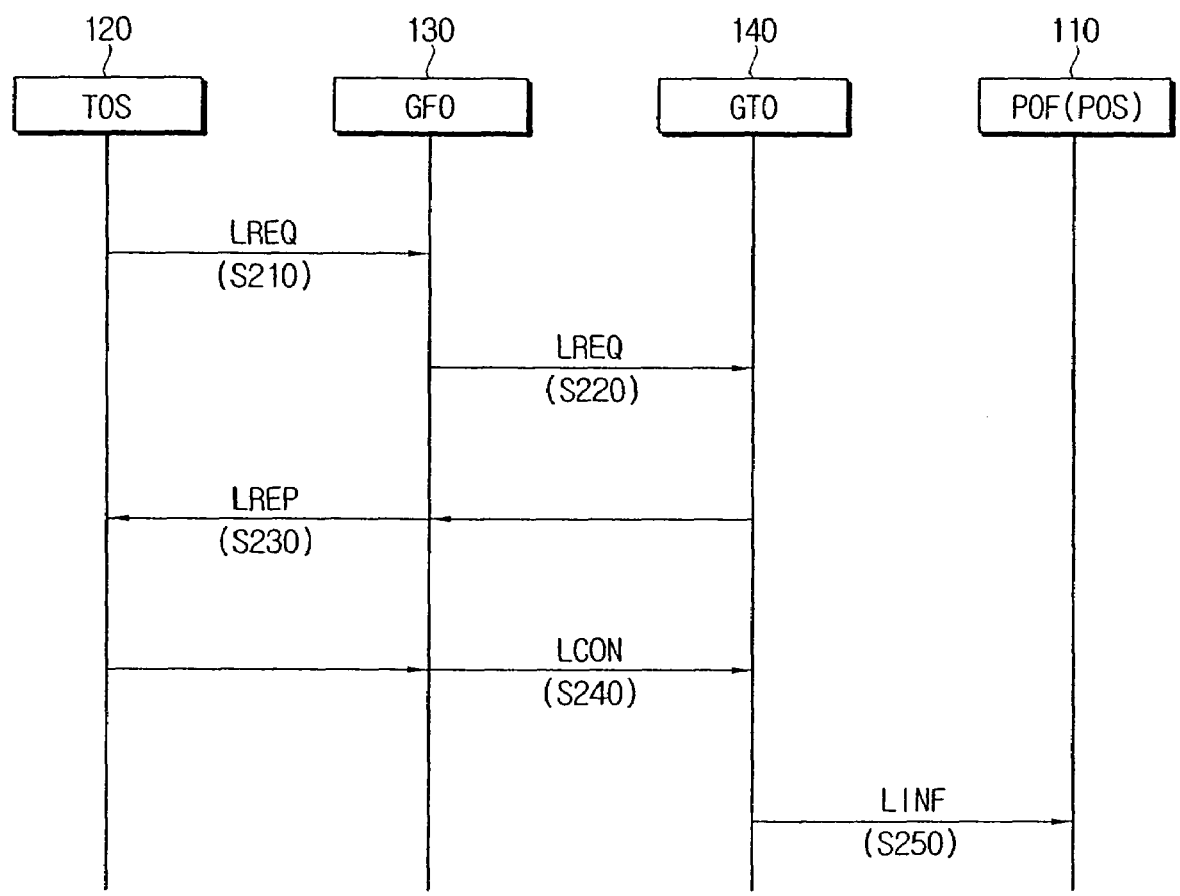
FIG. 2 is a message sequence chart illustrating the exemplary steps of a method for a tree route recovery according to an illustrative embodiment of the present invention.

FIG. 2 is a message sequence chart illustrating exemplary steps of a method for maintaining a tree route according to an illustrative embodiment of the present invention. Referring to FIG. 2, signals flow between the nodes G 120, K 130, F 140 and A 110. The nodes G 120 and K 130 are the lower nodes of the node C, and the node A 110 is an upper node of the node C. The node C corresponds to a parent of an orphaned sub-tree (POS), and the node G 120 corresponds to a top node of the orphaned sub-tree (TOS). The node K 130 can be a gateway node from the orphaned sub-tree (GFO), and the node F 140 can be a gateway node to the orphaned sub-tree (GTO). The node A 110 corresponds to a grandparent node of the TOS (POF).

When the link to the node C is broken, the node G 120, which is uppermost among the lower nodes of the node C, confirms the disconnection of the network and broadcasts a local repair request (LREQ) packet at step S210. The LREQ packet contains a time-to-live (TTL) field. The TTL is a hop limit of a new route to be established from the node G 120. For example, when a predetermined value is '2', the node G 120 broadcast the LREQ packet by setting the TTL to '2'. The TTL decreases by one at each one hop. The node K 130 re-broadcasts the LREQ packet by setting the TTL to '1' obtained by subtracting '1' from '2'. When the TTL becomes '0', the LREQ packet is discarded to recover the route with a minimal hop count.

The LREQ packet contains an address field of the TOS and a broadcast ID field, including the TTL field. The broadcast ID prevents the lower nodes of the TOS from repeatedly broadcasting the LREQ packet.

Upon receiving the broadcast LREQ packet, the node K 130 appends its address into the LREQ packet and broadcasts the LREQ packet at step S220. Only the node K 130 and the node L, which are one-hop nodes from the node G 120, broadcast the LREQ packet. It is preferred, but not necessarily the case, that the LREQ packet is re-broadcast only by lower nodes which are a one-hop distance from the node G 120.

A node, which is to act as a relay node for the route recovery among the nodes receiving the LREQ packet, sends a local repair reply (LREP) packet to the node G 120 via the node K 130 at step S230. According to an illustrative embodiment of the present invention, the node F 140 sends the LREP packet, but a plurality of nodes may send the LREP packet. The LREP packet contains an address of the GTO, a hierarchical order of the GTO in the tree structure, an address of the TOS, and a broadcast ID. The GFO appends its address into the LREP packet and sends the LREP packet to the TOS.

Upon receiving the LREP packet from the node F 140, the node G selects as the relay node a node with a highest hierarchical order in the tree structure and a lowest hop count from the node K 130 among the nodes sending the LREP packet including the node F 140. The node G 120 sends a local repair confirm (LCON) packet to the selected relay node (the node F 140) via the node K 130 at step S240. The LCON packet contains the TOS address, the POS address, the GFO address, and the GTO address.

Upon receiving the LCON packet, the node F 140 sends a local repair inform (LINF) packet to the POS node C since the node F 140 does not know whether the node C is broken or a link between the node C and the node G 120 is broken. The POF node A 110 firstly receives the LINF packet, detects whether the node C is broken or not, and informs a route setup from the node A 110 to the node G 120 at step S250. In an illustrative embodiment of the present invention, it is assumed that the network link is broken due to the broken node C. If the node C is reachable but the link between the node C and the node G 120 is broken, the node F 140 recovers the route by sending the LCON packet to the POS node C and re-establishing the route between the node C and the node G 120. The node A 110 sends to the node G 120 the LCON packet which contains its address, the address of the node G 120, and addresses of nodes along the established route, so that each node along the route can send and receive packets along the established route without having to store its own routing table. The node H also establishes a route to the node A via the nodes L and I in the same manner.

Figure 3:
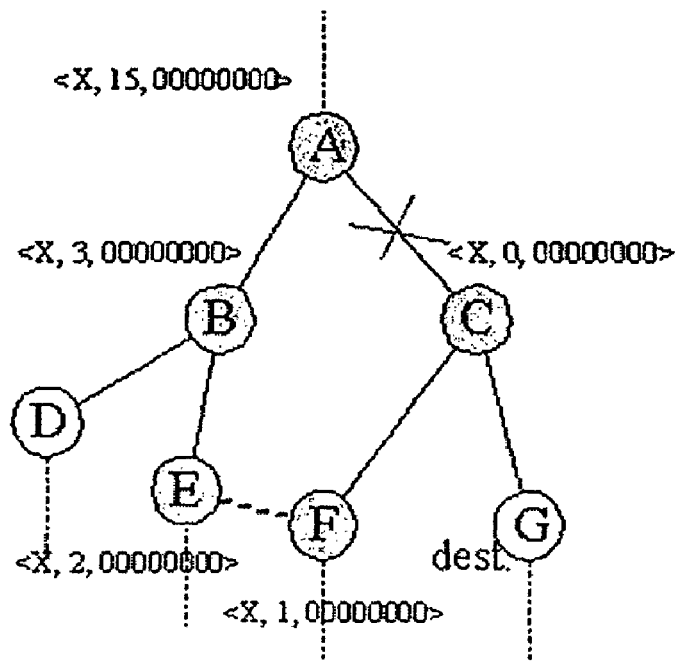
FIGS. 3 and 4 are diagrams illustrating the steps of a method for a tree route recovery according to another illustrative embodiment of the present invention.
Figure 4:
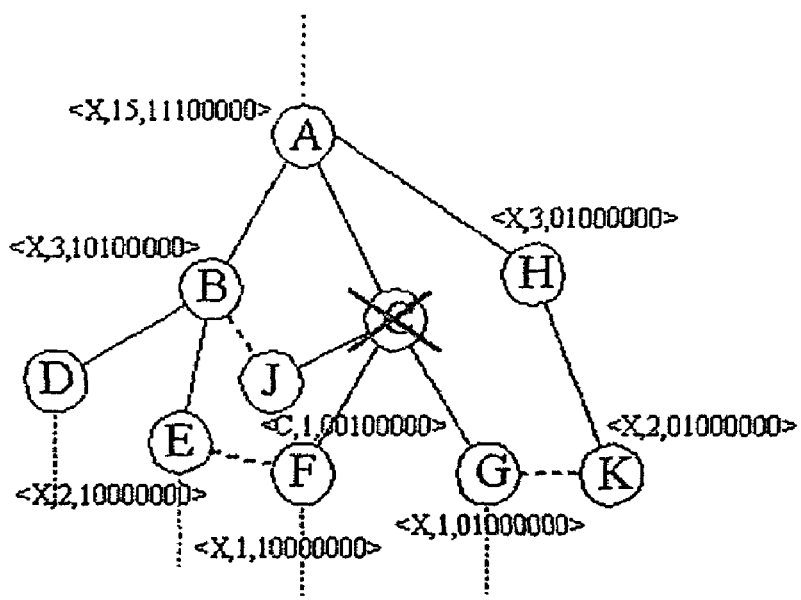

FIGS. 3 and 4 are diagrams illustrating the method for the tree route recovery according to another illustrative embodiment of the present invention. FIG. 3 illustrates a case when a link is broken between the node C and the node A. FIG. 4 illustrates a case when a network link is broken due to a failure or a movement of the node C out of the network.

In another illustrative embodiment of the present invention, an agent link, a substitute node (SN), a top boundary of the agent link (TB), and a bottom boundary of the agent link (BB) are introduced for the description. The agent link denotes a route between the TB and the BB by substituting a broken link when the link is broken due to a link or node failure.

The TB corresponds to the node A, and the BB corresponds to the node C of FIG. 3, and the nodes F, G, and J of FIG. 4. If the link is broken between the TB and the BB, the BB recovers the link via the agent link.

When it is confirmed that the link is broken between a node and its upper node, the node defines itself as the BB and the SN, defines the upper node as the TB, sets the TTL, and broadcasts the LREQ packet so as to recover the link. By way of example, the TTL is set to '2' in another illustrative embodiment of the present invention. The TTL denotes a maximum hop count of the agent link from the BB to the TB.

Referring now to FIG. 3, the node C broadcasts the LREQ packet to discover the agent link to the node A by defining itself as the BB and the SN and defining the node A as the TB. Upon receiving the LREQ packet, the node A sends the LREP packet to the node C.

When the BB does not receive the LREP packet for a certain discovery time period, the BB increases the TTL by one and re-broadcasts the LREQ packet. This procedure is repeated until the TTL becomes a maximum value (for example, '4'). When the BB does not receive the LREP packet before the TTL becomes the maximum value, the BB determines the disconnection since the upper node is not connected to the network due to a failure of the upper node. Hence, the node C modifies the SN from itself to the upper node, modifies the TB to an upper node of the SN, and broadcasts the LREQ packet to discover the agent link to the TB.

Referring now to FIG. 4, since the nodes F, G, and J cannot receive the LREP packet from the node C, the nodes F, G, and J determine that the node C is disconnected from the network due to a failure of the node C, and broadcast the LREQ packet to discover a route to the node A by modifying the SN to the node C and modifying the TB to its upper node A.

There are two ways to broadcast the LREQ packet from the BB to the TB. One is to broadcast the LREQ packet whenever a node is passed through from the BB to the TB. Accordingly, a larger number of nodes broadcast the LREQ packet to discover the agent link so that a shortest agent link from the TB to the BB can be discovered.

The other is to broadcast the LREQ packet to the TB along the tree route in the network by a LREQ-received node when the node receiving the broadcast LREQ packet from the BB determines that the SN is not its upper node. Since the LREQ-received node is not a lower node of the SN, the link is not broken so that packets can be delivered along the tree route. In this case, the route may be lengthened to some extent while traffic decreases.

Upon receiving the LREQ packet, the TB replies by sending an LREP packet to the BB along the route having a least hop count from the SN. The TB sets and stores an agent name, an agent ID, and a child ID of the failed node as an SN list for the agent link; appends the SN list to the LREP packet; and sends the LREP packet along the selected agent link.

The agent name is 12 bits, the agent ID is 4 bits, and the child ID of the failed node is 8 bits. The agent name denotes that the TB establishes an agent link for a node having a given agent name, which may be an address of the SN. The agent ID represents a hop count from a node to the SN so that the agent ID for the TB represents the hop count from the TB to the SN, and denotes that the TB node itself is an upper node of the SN since the hop count from the TB to the SN is the largest. If the BB and the SN are identical, the child ID of the failed node is set to '00000000' of 8 bits, which denotes that the SN is being connected to the network. If the BB and the SN are different from each other, then the network disconnection is due to an SN failure and the LREQ packet is received from the BB which is one of lower nodes of the SN. In this case, each child node of the SN is indicated by setting n-th bit of the child ID to '1' with respect to n-th lower node of the BB. Referring back to FIG. 4, the child ID is set to '10000000' with respect to the node F, '01000000' with respect to the node G, and '00100000' with respect to the node J.

Upon receiving the LREP packet from the node A (TB), each node of the agent link recognizes itself as a node of the agent link, and generates or updates the SN list. When generating or updating the SN list, the agent name is extracted from the SN list contained in the LREP packet and the extracted agent name is represented as the agent name. The agent ID is represented as a hop count from a given node of the agent link to the SN. When updating the SN list, if the hop count is greater than a current agent ID, the agent ID is updated. When the BB is the n-th lower node of the SN, the n-th bit of the child ID is set to '1'. Hence, when the SN and the BB are the same node, the child ID becomes '00000000'.

There are two ways for each node to obtain information on the agent link for sending the LREP packet from the TB to the BB.

One way is to append an address of each node to the LREQ packet when sending the LREQ packet from the BB to the TB. Since the information on the agent link is contained in the LREQ and LREP packets, each node needs not append its address to the LREQ packet. Accordingly, the LREP packet is sent from the TB to the BB.

The other way is to store information on the agent link between the BB and the TB by each node along the agent link. Each node has to store a TB address, a BB address, an ID of the LREQ packet, and an address of a node which sent the LREQ packet from the BB, that is, an address of a node to which the LREP packet is sent.

Figure 5:
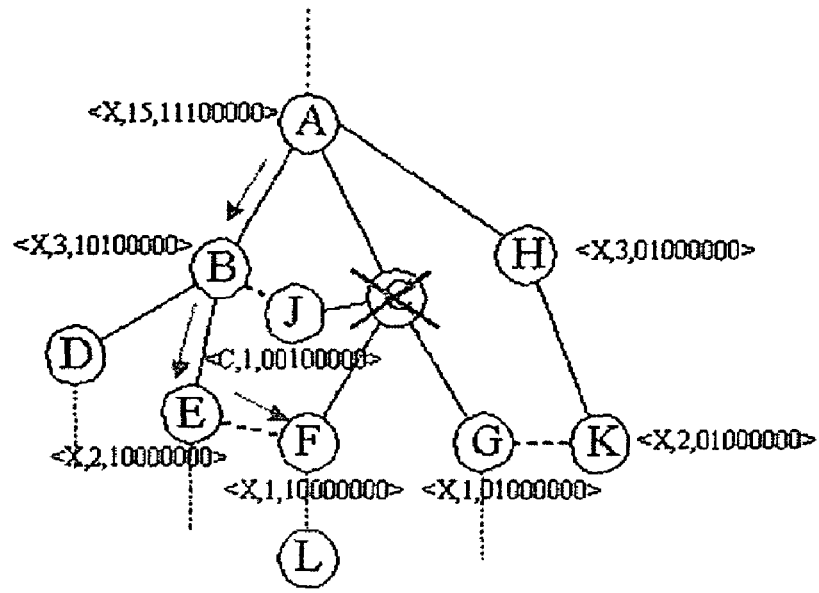
FIGS. 5 and 6 are diagrams illustrating exemplary steps of communications along a recovered route according to another illustrative embodiment of the present invention.
Figure 6:
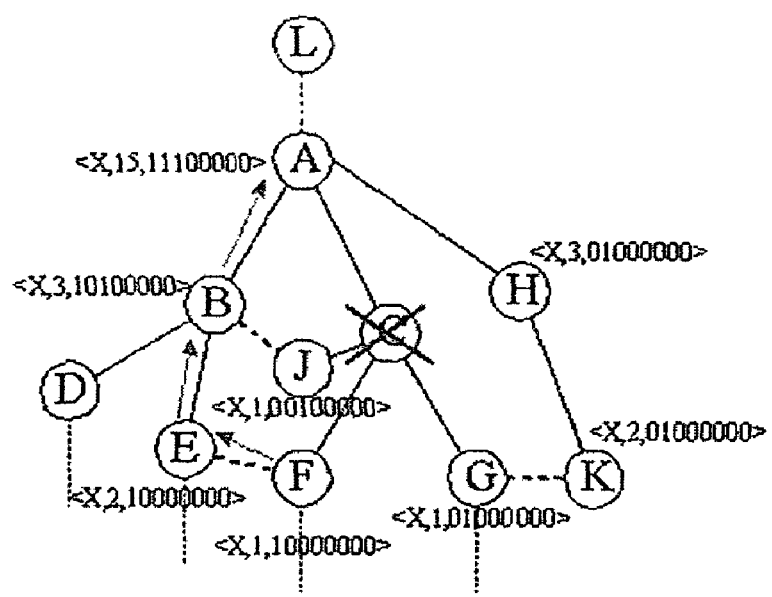

FIGS. 5 and 6 are diagrams illustrating exemplary steps of communications along the recovered route according to still another illustrative embodiment of the present invention.

Referring to FIG. 5, when the node A delivers data packets to the node L, the data packets are broadcast by setting an agent address of the data packets to <X, 15, 10000000> and setting RELAY to '1' since the data packets cannot be sent to the node C of a next one-hop node. The agent address is set to <agent name, agent ID, child ID> as contained in the SN list in that order. The agent name 'X' indicates the address of the node C, the agent ID indicates a hop count from the node A to the node C, and the child ID indicates that the node L is a descendent of a first lower node of the node C.

Still referring to FIG. 5, while the nodes B and H receive the broadcast data from the node A, only the node B re-broadcasts the data packets since the first bit of the child ID of the data packets is '1' and that of the node H is not '1'. In the same manner, the data packets broadcast by the node B are re-broadcast by the node E, and then by the node F so that the destination node L receives the data packets.

Referring now to FIG. 6, while the nodes E and J receive the broadcast data packets from the node F, only the node E re-broadcasts the data packets since the first bit of the child ID of the data packets is '1' and that of the node J is not '1'. In the same manner, the broadcast data packets from the node E are re-broadcast by the node B, and then by the node A. The node A sends the data packets to the destination node L along the existing tree route.

As explained in the foregoing, even when the node or the link in the wireless tree network fails, the broken route is optimally recovered while maintaining the existing tree route. As a result, there is no need to re-establish the whole route, thus reserving the network resources while efficiently establishing the route.

While illustrative embodiments of the present invention have been described, additional variations and modifications of the embodiments may occur to those skilled in the art once they learn of the basic inventive concepts. Therefore, it is intended that the appended claims shall be construed to include both the above illustrative embodiments and all such variations and modifications that fall within the spirit and scope of the invention.

What is claimed is:

1. A route recovery method in a wireless network of a tree topology having a plurality of nodes, in which a second node, which is a lower node of a first node and is disconnected from the first node, recovers a route in the network, the route recovery method comprising:

the second node broadcasting a local repair request (LREQ) packet;

at least one of the nodes receiving the LREQ packet and sending a local repair reply (LREP) packet to the second node to act as a relay node for the route recovery;

the second node selecting the relay node from among the nodes sending the LREP packet, and sending a local repair confirm (LCON) packet to the selected relay node; and establishing the route between the second node and the first node by the relay node sending a local repair inform (LINF) packet to the first node, wherein the wireless network is of a tree topology and the second node, which is the lower node of the first node and is disconnected from the first node, recovers the route in the network, wherein the route is established between a third node, which is an upper node of the first node, and the second node by sending the LINF packet to the third node when the first node is disconnected from the network, and wherein a fourth node, which is a lower node of the second node, re-broadcasts the LREQ packet when the second node does not receive the LREP packet for a predetermined amount of time.

2. The route recovery method of claim 1, wherein the LREP packet is sent to the second node with an address of the fourth node, when the fourth node receives the LREP packet.

3. The route recovery method of claim 1, wherein the relay node establishes a route from one of the first node and the upper node to the second node via the lower node.

4. The route recovery method of claim 1, wherein the LREQ packet includes at least one of an address of the second node and a broadcast ID of the LREQ packet.

5. The route recovery method of claim 1, wherein the LREP packet includes at least one of an address of the second node, an address of the relay node, and a hop count from the relay node to the second node.

6. The route recovery method of claim 1, wherein the second node broadcasts the LREQ packet by setting a limit value of the hop count from the second node to the relay node.

7. The route recovery method of claim 6, wherein the second node re-broadcasts the LREQ packet by increasing the limit value of the hop count when the LREP packet is not received for a predetermined amount of time.

8. The route recovery method of claim 1, wherein the second node selects the relay node from among the nodes sending the LREP packet, based on a hop count between each of the nodes sending the LREP packet and the second node.

9. The route recovery method of claim 8, wherein the second node selects the relay node among the at least one node sending the LREP packet, based on a hierarchy in the tree topology.

10. The route recovery method of claim 1, wherein the LINF packet contains an address of the node sending the LINF packet and the address of the second node.

11. The route recovery method of claim 1, wherein the relay node stores a routing table recording the route from the first node to the second node.

12. The route recovery method of claim 1, wherein each node along the route from the first node to the second node stores a routing table recording the route.

13. The route recovery method of claim 1, wherein the first node sends to the second node an LCON packet including an address of each node along the route.

* * * * *